US012339668B2

(12) United States Patent
Fukunaga et al.

(10) Patent No.: US 12,339,668 B2
(45) Date of Patent: Jun. 24, 2025

(54) PATH PLANNING DEVICE

(71) Applicant: Sony Group Corporation, Tokyo (JP)

(72) Inventors: Daisuke Fukunaga, Tokyo (JP);
Norifumi Kikkawa, Tokyo (JP)

(73) Assignee: SONY GROUP CORPORATION,
Tokyo (JP)

( * ) Notice: Subject to any disclaimer, the term of this patent is extended or adjusted under 35 U.S.C. 154(b) by 105 days.

(21) Appl. No.: 18/253,925

(22) PCT Filed: Nov. 12, 2021

(86) PCT No.: PCT/JP2021/041712
§ 371 (c)(1),
(2) Date: May 23, 2023

(87) PCT Pub. No.: WO2022/124004
PCT Pub. Date: Jun. 16, 2022

(65) Prior Publication Data
US 2024/0004401 A1    Jan. 4, 2024

(30) Foreign Application Priority Data

Dec. 9, 2020   (JP) ................. 2020-204418

(51) Int. Cl.
*G05D 1/00*    (2024.01)
*B25J 9/16*    (2006.01)
(Continued)

(52) U.S. Cl.
CPC .......... *G05D 1/0289* (2013.01); *B25J 9/1664* (2013.01); *G01C 21/34* (2013.01);
(Continued)

(58) Field of Classification Search
CPC .... G05D 1/0289; G05D 1/0088; G05D 1/246; G05D 1/693; G05D 2105/28;
(Continued)

(56) References Cited

U.S. PATENT DOCUMENTS 10,642,282 B2 * 5/2020 Kichkaylo .......... G05D 1/0274
10,884,430 B2 * 1/2021 Kumar .................. G05D 1/104
(Continued)

FOREIGN PATENT DOCUMENTS

| JP | 2006-133863 A | 5/2006 |
| JP | 2019-503024 A | 1/2019 |
| JP | 2020-518890 A | 6/2020 |

OTHER PUBLICATIONS

International Search Report and Written Opinion mailed on Jan. 25, 2022, received for PCT Application PCT/JP2021/041712, filed on Nov. 12, 2021, 9 pages including English Translation.
(Continued)

*Primary Examiner* — Sohana Tanju Khayer
(74) *Attorney, Agent, or Firm* — XSENSUS LLP

(57) ABSTRACT

A path planning device of the present disclosure includes: an input unit that accepts an input of data to be used in path planning, with respect to all of multiple moving bodies present in environment to be subjected to the path planning, in which the multiple moving bodies include at least one first moving body having a goal and at least one second goal-less moving body; and a planning unit that plans behavior until the time at which the first moving body has reached the goal, with respect to all of the multiple moving bodies, on the basis of the data inputted into the input unit.

10 Claims, 11 Drawing Sheets

(51) Int. Cl.
   *G01C 21/34*  (2006.01)
   *G05D 1/246*  (2024.01)
   *G05D 1/693*  (2024.01)

(52) U.S. Cl.
   CPC ........... *G05D 1/0088* (2013.01); *G05D 1/246* (2024.01); *G05D 1/693* (2024.01)

(58) Field of Classification Search
   CPC ........... G05D 2107/70; G05D 2109/10; G05D 1/6987; B25J 9/1664; G01C 21/34
   See application file for complete search history.

(56) References Cited

U.S. PATENT DOCUMENTS

| | | | | |
|---|---|---|---|---|
| 11,345,032 | B2* | 5/2022 | Taira | B25J 5/007 |
| 11,366,470 | B2* | 6/2022 | Panigrahi | B60L 53/64 |
| 11,707,843 | B2* | 7/2023 | Lin | B25J 9/1666 |
| | | | | 700/255 |
| 2009/0015460 | A1* | 1/2009 | Fox | G01S 13/867 |
| | | | | 342/53 |
| 2010/0198443 | A1* | 8/2010 | Yabushita | G05D 1/0274 |
| | | | | 701/25 |
| 2011/0130905 | A1* | 6/2011 | Mayer | G07C 5/008 |
| | | | | 340/439 |
| 2016/0320774 | A1* | 11/2016 | Kuhara | G05D 1/0287 |
| 2017/0057087 | A1* | 3/2017 | Lee | G01C 21/3453 |
| 2017/0118307 | A1* | 4/2017 | Beaurepaire | H04W 4/40 |
| 2017/0278389 | A1* | 9/2017 | Okazaki | G08G 1/054 |
| 2019/0015981 | A1* | 1/2019 | Yabushita | B25J 5/007 |
| 2019/0050092 | A1* | 2/2019 | Yamashita | G08G 1/20 |
| 2019/0383629 | A1* | 12/2019 | Lee | B60W 30/18163 |
| 2020/0004588 | A1* | 1/2020 | Sarkar | B25J 9/1661 |
| 2020/0175429 | A1* | 6/2020 | Beaurepaire | G06Q 10/02 |
| 2020/0249674 | A1* | 8/2020 | Dally | G05D 1/0221 |
| 2020/0271965 | A1* | 8/2020 | Tang | G06T 7/62 |
| 2021/0197813 | A1* | 7/2021 | Houston | B60W 30/143 |
| 2021/0261091 | A1* | 8/2021 | Drayna | B60L 53/68 |
| 2022/0011127 | A1* | 1/2022 | Lee | B60W 40/04 |
| 2022/0048535 | A1* | 2/2022 | Niendorf | G01C 21/165 |
| 2022/0089375 | A1* | 3/2022 | Cho | H01L 21/67724 |
| 2022/0097728 | A1* | 3/2022 | Lin | G06N 20/00 |
| 2022/0120575 | A1* | 4/2022 | Machida | G01C 21/3453 |
| 2022/0163969 | A1* | 5/2022 | Li | G08G 1/096811 |
| 2022/0164747 | A1* | 5/2022 | Shah | G06Q 10/20 |
| 2023/0154330 | A1* | 5/2023 | Li | G08G 1/0145 |
| | | | | 701/301 |
| 2023/0274645 | A1* | 8/2023 | Dürr | G05D 1/0289 |
| | | | | 701/2 |
| 2024/0019872 | A1* | 1/2024 | Yamada | G05D 1/0297 |

OTHER PUBLICATIONS

Grenouilleau, F. et al., "A Multi-Label A Algorithm for Multi-Agent Pathfinding", Proceedings of the Twenty-Ninth International Conference on Automated Planning and Scheduling, vol. 29, 2019, 5 pages.

Sharon, G. et al., "Conflict-based search for optimal multi-agent pathfinding", Artificial Intelligence, vol. 219, 2015, pp. 40-66.

* cited by examiner

FIG. 1
COMPARATIVE EXAMPLE
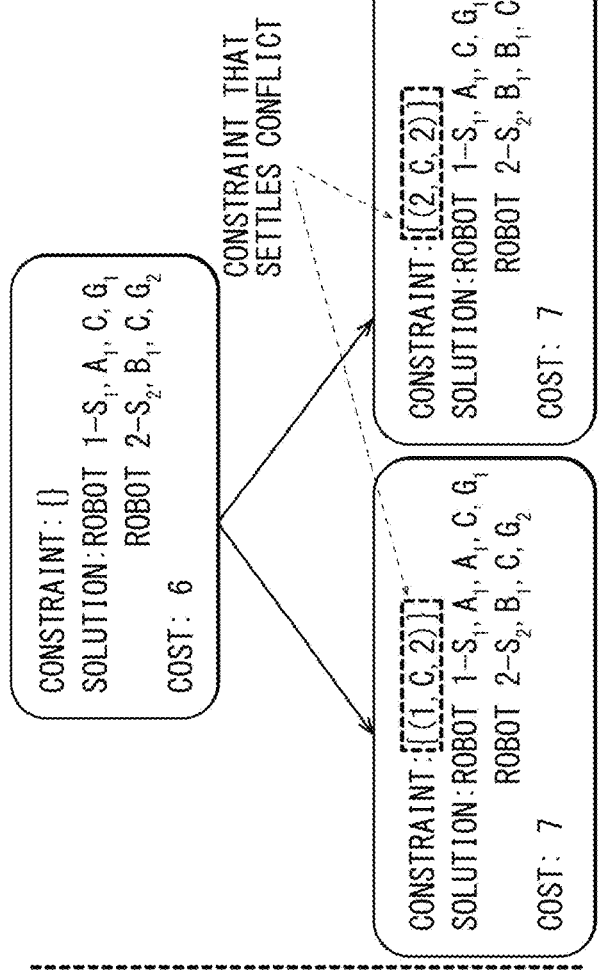
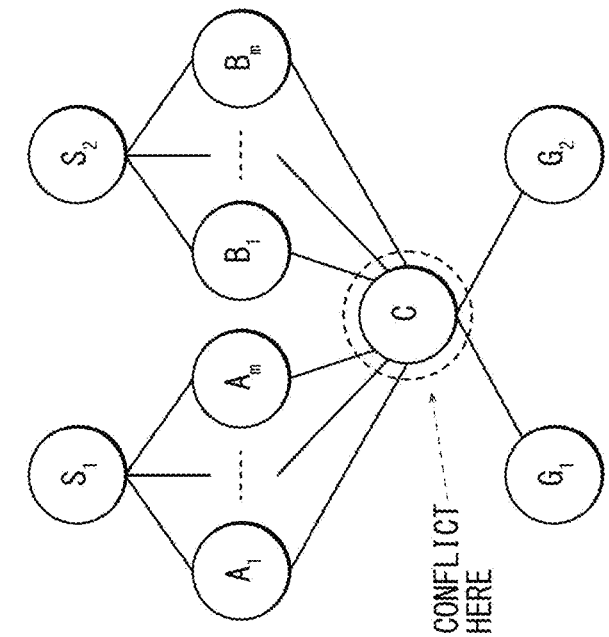

PATH PLANNING DEVICE

CROSS-REFERENCE TO RELATED APPLICATIONS

The present application is based on PCT filing PCT/JP2021/041712, filed Nov. 12, 2021, which claims priority to Japanese Patent Application No. 2020-204418, filed with the Japan Patent Office on Dec. 9, 2020, the entire contents of each are incorporated herein by reference.

TECHNICAL FIELD

The present disclosure relates to a path planning device that plans a path of movement of multiple moving bodies.

BACKGROUND ART

There are techniques of making path plans of multiple moving bodies (e.g., robots) (Non-Patent Literatures 1 and 2). In general, in the techniques of making path plans of multiple moving bodies, it is assumed that goals are assigned to all robots.

CITATION LIST

Non-Patent Literature

Non-Patent Literature 1: G. Sharon, et al., "Conflict-Based Search for Optimal Multi-Agent Pathfinding," Artificial Intelligence, Vol. 219, pp. 40-66 (2015)

Non-Patent Literature 2: F. Grenouilleau, et al., "A Multi-Label A* Algorithm for Multi-Agent Pathfinding," Proceedings of the Twenty-Ninth International Conference on Automated Planning and Scheduling, Vol. 29 (2019)

SUMMARY OF THE INVENTION

In a case where a system using multiple moving bodies is actually in operation, not all the moving bodies always have goals. Accordingly, for example, in a case with the presence of a moving body without a goal, it is difficult to plan optimal paths.

It is desirable to provide a path planning device that makes it possible to plan optimal paths of multiple moving bodies.

A path planning device according to an embodiment of the present disclosure includes: an input unit that accepts an input of data to be used in path planning, with respect to all of multiple moving bodies present in environment to be subjected to the path planning, in which the multiple moving bodies include at least one first moving body having a goal and at least one second goal-less moving body; and a planning unit that plans behavior until time at which the first moving body has reached the goal, with respect to all of the multiple moving bodies, on the basis of the data inputted into the input unit.

In the path planning device according to the embodiment of the present disclosure, on the basis of the data regarding all of the multiple moving bodies including the at least one first moving body having the goal and the at least one second goal-less moving body, the behavior until the time at which the first moving body has reached the goal is planned, with respect to all of the multiple moving bodies.

BRIEF DESCRIPTION OF DRAWING

FIG. 1 is a configuration diagram illustrating an overview of a path planning technique related to a comparative example.

MODES FOR CARRYING OUT THE INVENTION

Figure 2:
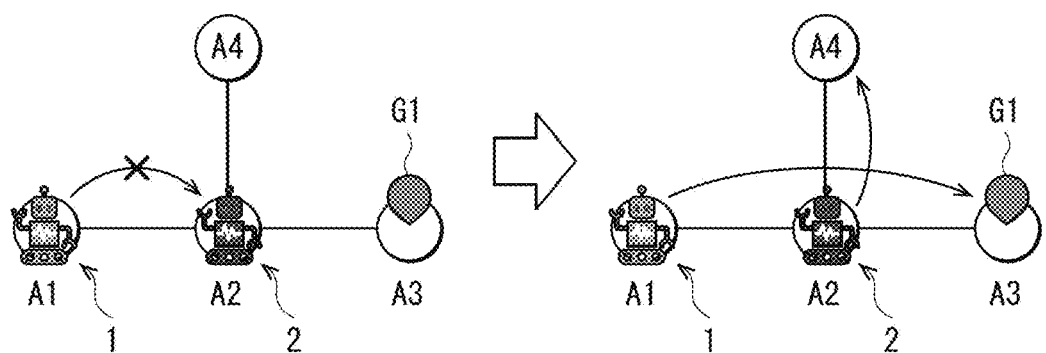
FIG. 2 is an explanatory diagram schematically illustrating a first example of a problem of the path planning technique related to the comparative example and its improvement example.

In the following, some embodiments of the present disclosure are described in detail with reference to the drawings. It is to be noted that description is given in the following order.

0. Comparative Example (FIGS. 1 to 3)
1. First Embodiment (FIGS. 4 to 12)
   1.1 Configuration
   1.2 Operation
   1.3 Application Example
   1.4 Effects
2. Other Embodiments

0. COMPARATIVE EXAMPLE (Overview of Path Planning Technique Related to Comparative Example)

One of the important functions of an autonomously moving robot is path planning. Path planning is calculation of what path a robot should move along to a goal point, with the use of a map of the surrounding environment. Moreover, simultaneous calculation of paths of multiple robots is referred to as multi-robot path planning. In the case of multi-robot path planning, it is necessary to search for paths that do not conflict with other robots. Accordingly, the calculation becomes much more complicated than the path planning of a single robot. Conflict means that collision or deadlock between multiple robots inhibits robots from reaching their goals.

One of the techniques of the multi-robot path planning is CBS (Conflict-Based Search). This is a search-based technique devised by Sharon, et al. in 2012, and makes it possible to find an optimal solution without conflict between multiple robots (see Non-Patent Literature 1). The optimal solution is generally a path that minimizes total time until a robot arrives at a goal.

FIG. 1 illustrates an outline of the CBS algorithm as an example of the path planning technique related to a comparative example.

The CBS is an algorithm that starts at the shortest path of each robot (without considering the presence of other robots), and eventually finds an optimal solution without any conflict, while solving conflict (Conflict) between multiple robots one by one. In the CBS, this is realized by expanding a binary tree called a constraint tree (Constraint tree) and searching for a solution.

Let us consider, as an example, a graph of apexes $S_1$, $S_2$, $A_1, A_2, \ldots, A_m, B_1, B_2, \ldots, B_m, C, G_1$, and $G_2$ illustrated in FIG. 1 (i). The apexes $S_1$ and $S_2$ are starting points of robots 1 and 2, respectively. The apexes $G_1$ and $G_2$ are goal points of the robots 1 and 2, respectively.

Moreover, the robots 1 and 2 advance one edge in each time step. At this occasion, the constraint tree is as illustrated in FIG. 1 (ii). Each node of the constraint tree includes: (1) a set of constraints (Constraint) (constraints in FIG. 1 (ii)); (2) a set of paths of the respective robots (solutions in FIG. 1 (ii)); and (3) total cost (cost in FIG. 1 (ii)).

First, a root node makes the shortest path of each robot without any constraints. Accordingly, the path of the robot 1 is $S_1 \rightarrow A_1 \rightarrow C \rightarrow G_1$, and the path of the robot 2 is $S_2 \rightarrow B_1 \rightarrow C \rightarrow G_2$. Here, the robot 1 and the robot 2 conflict with each other at the apex C in the second step. Accordingly, a child node is generated to which a constraint is added that inhibits a robot from reaching the apex C in the second step. At this occasion, two child nodes are formed for the constraint on the robot 1 and the constraint on the robot 2. The constraint is represented by: (1) the target robot; (2) the unreachable apex; and (3) the number of steps. The constraint illustrated in the lower left of FIG. 1 (ii): {(1, C, 2)} is a constraint that the robot 1 must not reach the apex C in the second step.

At the child node, the shortest path of each robot is re-calculated on the basis of the constraints. For example, at the child node illustrated in the lower left of FIG. 1 (ii), the robot 1 stands by for one step at the apex $A_1$ ($S_1 \rightarrow A_1 \rightarrow A_1 \rightarrow C \rightarrow G_1$) because of the constraints. In this way, it is possible to solve the conflict mentioned above. The standby causes an increase in the number of steps by one step, causing the total cost to increase by one with respect to the parent node. Repeating this procedure eventually leads to finding a combination of paths without conflicts. Moreover, by expanding the nodes in the ascending order of the total cost, a combination of first-found paths without conflicts becomes an optimal solution (i.e., a solution with the smallest cost).

A flow of the CBS algorithm is summarized as follows.
1. Obtain the shortest path of each robot.
2. Detect a conflict between multiple robots.
3. Create a child node to which a constraint is added that inhibits the conflict.
4. Calculate the path of each robot to satisfy the constraint, and obtain the cost.
5. Repeat the processes 2 through 4 for the lowest-cost node.
6. End when a node without conflicts appears.

The search for the constraint tree is called High-level search. Meanwhile, the path search of each robot based on the constraint in the process 4 mentioned above is called Low-level search. In Low-level search, the shortest path is searched by the A* algorithm with respect to each robot. At this occasion, a path that does not satisfy the constraint is excluded from choices of the solution. Again, Low-level search focuses on only the constraints, without considering the paths of the other robots at all. Stretching the constraint tree in this way makes it possible to eventually search for the patterns of all the paths. That is, a solution (a set of paths without conflicts) is found if any. Thus, it can be said that the CBS is an optimal algorithm with integrity.

(Problems and Improvement Examples)

Existing multi-robot path planning algorithms, including the CBS described above, assume that goals are assigned to all robots. However, in a case where a mobile system using multiple robots is actually in operation, not all the robots always have goals. For example, let us consider the following cases as illustrated in FIGS. 2 and 3.

FIG. 2 schematically illustrates a first example of a problem of the path planning technique related to the comparative example and its improvement example. FIG. 3 schematically illustrates a second example of a problem of the path planning technique related to the comparative example and its improvement example.

Figure 3:
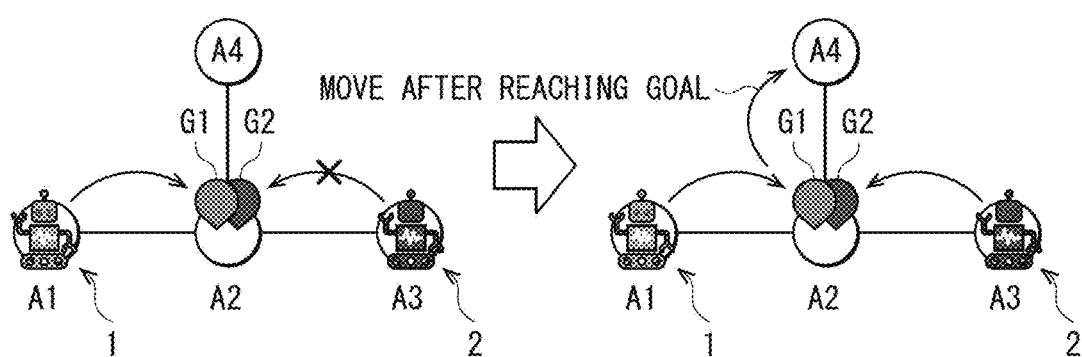
FIG. 3 is an explanatory diagram schematically illustrating a second example of a problem of the path planning technique related to the comparative example and its improvement example.

In FIGS. 2 and 3, it is assumed that the robots 1 and 2 are movable through any of apexes A1, A2, A3, and A4. In FIGS. 2 and 3, the path planning technique related to the comparative example is illustrated on the left, while the improvement examples employing the technology of the present disclosure described later are illustrated on the right.

First, FIG. 2 illustrates a situation in which, at the start point of time, the robot 1 is present at the apex A1, the robot 2 is present at the apex A2, a goal point G1 of the robot 1 is the apex A3, and the robot 2 is goal-less. In the path planning technique related to the comparative example, as illustrated in FIG. 2 on the left, the presence of the goal-less robot 2 inhibits the robot 1 from arriving at the goal point G1. However, if the goal-less robot 2 moves to the apex A4 as illustrated in the improvement example in FIG. 2 on the right, the robot 1 is able to arrive at the goal point G1.

Next, FIG. 3 illustrates a situation in which, at the start point of time, the robot 1 is present at the apex A1, the robot 2 is present at the apex A3, and the goal points G1 and G2 of the robots 1 and 2 are both the same apex A2. In the path planning technique related to the comparative example, as illustrated in FIG. 3 on the left, if the same goal is assigned to multiple different robots, no solution is found. This is because a conflict at the goal point cannot be solved. However, as illustrated in the improvement example in FIG. 3 on the right, if the robot that first has attained the goal (the robot 1 in the example in FIG. 3 on the right) is moved to another place after reaching the goal, both of the robots 1 and 2 are able to attain the goal.

As described, in the path planning technique related to the comparative example, "movement of a goal-less robot" and "post-goal movement after reaching a goal" is not taken into consideration. This results in occurrence of a pattern in which no path is planned. In contrast, in the embodiment employing the technology of the present disclosure described later, it is possible to plan optimal paths including the "movement of a goal-less robot" and the "post-goal movement".

It is to be noted that as a technique according to another comparative example, the algorithm proposed by Grenouilleau, et al. makes it possible to calculate a solution by giving multiple goal sequences to robots (see Non-Patent Literature 2). However, even in this algorithm, the "movement of a goal-less robot" and the "post-goal movement" are not taken into consideration. This algorithm includes only adjusting the order in which multiple robots reach their goals. It follows, therefore, that the technology of the present disclosure described later makes it possible to obtain an optimal solution in a wider range.

1. FIRST EMBODIMENT

In the following, description is made by giving an example case where mobile bodies are robots, but the technology of the present disclosure is also applicable to other mobile bodies than robots.

1.1 Configuration (Overview)

First, description is given of differences between the path planning algorithm related to the comparative example described above and a path planning algorithm by a path planning device according to the first embodiment. In the path planning device according to the first embodiment, unlike the comparative example, planning is carried out including the "movement of a goal-less robot" and the "post-goal movement". To realize this, the following new processing is added to the path planning algorithm related to the comparative example.

1. Data regarding all robots present in environment to be subjected to the path planning, including goal-less robots, is inputted as data to be used in the path planning. For example, as data regarding points, a starting point (a current position) and a goal point are inputted with respect to a robot having a goal, while only a current position is inputted with respect to a goal-less robot. It is to be noted that in the path planning technique related to the comparative example, only the data regarding the robot having the goal is inputted as the data to be used in the path planning.

2. With respect to all the robots present in the environment to be subjected to the path planning, behavior (e.g., moving and standing by) until the time at which all of the robots having the goals arrive at the goals is planned. The planning is carried out to allow "goal-less robots" and "robots that arrive at the goals early" to "stand by on the spot" or "move somewhere" until other robots arrive at the goals. Regardless of whether they have goals or not, all of the robots are not allowed to conflict until the finish time of the plan (i.e., the time at which all of the robots having the goals arrive at the goals). It is to be noted that in the path planning technique related to the comparative example, only the behavior (of the robot itself) until the arrival at the goal is planned.

3. The "movement of a goal-less robot" and the "post-goal movement" are not allowed to contribute to a degree of optimality of the planning (the total time until the arrival at the goal). With respect to these movements, searches for optimal paths are made with the use of a different score (secondary score) from a normal score (i.e., time until the arrival at the goal: primary score). The secondary core is assumed to be a distance of movement. In other words, with respect to these movements, the optimal solution is to stand by on the spot. Only in a case where it is necessary to move from the goal point, the planning is made to move over a minimum distance.

4. Enter the stop time to stop at the goal point is inputted in the path planning. With respect to the post-goal movement, the planning is made to stop for specified time and then move. This assumes time required for a task to be carried out at the goal point. Moreover, similarly, the stop time to stop at the starting point may be inputted to the path planning. The planning is carried out to allow the robot to stop for specified time before starting to move. This assumes that in a case where there is a robot in the middle of a task, the remaining time required for the task is specified.

Definition of Goal

In a normal use case, a robot arrives at a goal point and then performs some predetermined task (e.g., loading and unloading of a load). In the first embodiment, a goal means a state in which a robot has arrived at a goal point and is ready to carry out a predetermined task. Moreover, reaching a goal means a state in which a robot has arrived at a goal point and has finished carrying out a predetermined task. In other words, even if a robot arrives at a goal point, this does not always mean that the robot attains a goal and has reached a goal. There is possibility that the robot passes through the goal point once, returns to the goal point again, and then carries out the predetermined task. The intention is to take such an event into consideration in the path planning. However, the technology of the present disclosure is also applicable to a case where simply arriving at a goal point without carrying out a predetermined task means a goal.

Configuration Example

Figure 4:
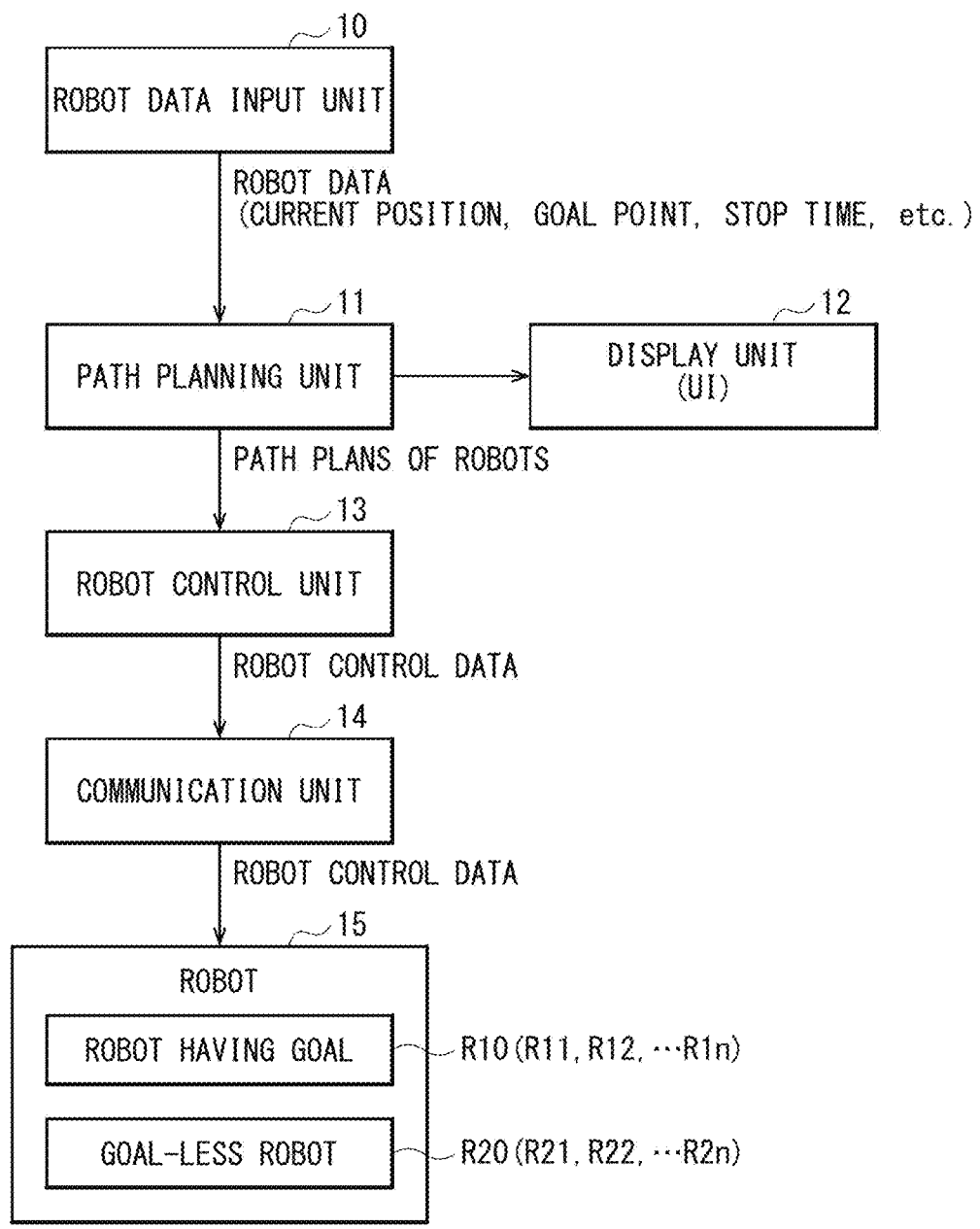
FIG. 4 is a block diagram schematically illustrating a configuration example of a path planning device according to a first embodiment of the present disclosure.

FIG. 4 schematically illustrates a configuration example of the path planning device according to the first embodiment of the present disclosure.

The path planning device according to the first embodiment includes a robot data input unit 10, a path planning unit 11, a display unit 12, a robot control unit 13, and a communication unit 14.

The path planning device according to the first embodiment may include a computer terminal including, for example, a CPU (Central Processing Unit), a ROM (Read Only Memory), and a RAM. In this case, the CPU may carry out the processing to be performed by the path planning unit 11 and the robot control unit 13.

The path planning device according to the first embodiment plans paths of multiple robots 15. The multiple robots 15 may include at least one robot R10 (R11, R12, . . . R1$n$) having a goal and at least one goal-less robot R20 (R21, R22, . . . R2$m$). It is to be noted that the robot R10 having the goal and the goal-less robot R20 among the multiple robots 15 do not need to be determined in advance. The robot R10 having the goal and the goal-less robot R20 may be changed each time the path planning is performed.

The robot R10 having the goal corresponds to a specific example of a "first moving body" in the technology of the present disclosure. The goal-less robot R20 corresponds to a specific example of a "second moving body" in the technology of the present disclosure.

The robot data input unit 10 includes, for example, a keyboard and a pointing device, and accepts inputs of various kinds of data from a user. Moreover, the robot data input unit 10 may accept inputs of various kinds of data from a higher-level system. For example, in an application example illustrated in FIG. 12 described later, the robot data input unit 10 may accept inputs of various kinds of data from an MCS 22. The robot data input unit 10 accepts inputs of data to be used in the path planning (robot data), with respect to all of the multiple robots 15 present in the environment to be subjected to the path planning, including the robot R10 having the goal and the goal-less robot R20. The robot data input unit 10 outputs the robot data regarding all of the multiple robots 15 present in the environment to the path planning unit 11 (regardless of whether the robots 15 have the goals or not). The robot data includes, for example, at least one piece of data out of, without limitation, a current position, a direction, a starting point and a goal point of the movement, stop time at the starting point, and stop time at the goal point of each of the robots 15.

The robot data input unit 10 corresponds to a specific example of an "input unit" in the technology of the present disclosure.

The path planning unit 11 plans the behavior until the time at which the robot R10 having the goal has reached the goal, with respect to all of the multiple robots 15, on the basis of the robot data inputted to the robot data input unit 10. The path planning unit 11 makes the path plans of all of the robots 15 with the use of the algorithm described in the overview in the forgoing, and outputs the path plans to the robot control unit 13. Here, the path plans include movement plans, e.g., moving and standing by, of each of the multiple robots 15 at each time until the finish time of the path plans.

The path planning unit 11 corresponds to a specific example of a "planning unit" in the technology of the present disclosure.

The path planning unit 11 plans optimal behavior to inhibit the multiple robots 15 from conflicting with one another until the time at which the robot R10 having the goal has reached the goal. The path planning unit 11 sets the time until the robot R10 having the goal arrives at the goal point and carries out the predetermined task, as the time at which the robot R10 having the goal has reached the goal.

In a case where the multiple robots R10 having the goals are present, the path planning unit 11 plans the behavior until the time at which all of the multiple robots R10 having the goals have reached the goals, with respect to all of the multiple robots 15. In this case, the path planning unit 11 plans time-optimal behavior to make earliest the time at which all of the multiple robots R10 having the goals have reached the goals.

Moreover, in the case where the multiple robots R10 having the goals are present, when a part of the multiple robots R10 having the goals has reached the goals before the time at which the multiple robots R10 have reached the goals, the path planning unit 11 plans post-goal behavior of the robot 15 that has reached the goal, until the time comes when all of the multiple robots R10 having the goals have reached the goals. The part of the multiple robots R10 includes the at least one robot R10 out of the multiple robots R10 having the goals. In this case, the path planning unit 11 may plan distance-optimal behavior to make shortest the distance of movement, with respect to the behavior of the goal-less robot R20 and the post-goal behavior of the robot 15 that has reached the goal.

The display unit 12 includes, for example, a display, and displays data indicating the behavior of all of the multiple robots planned by the path planning unit 11. The display unit 12 displays, for example, a user interface (UI) screen as illustrated in FIGS. 8 to 11 described later.

The robot control unit 13 generates robot control data (e.g., proceed to xx, stop) on the basis of the path plans by the path planning unit 11, and outputs the robot control data to the communication unit 14.

The communication unit 14 transmits the robot control data from the robot control unit 13 to the robot 15 through a communication network such as the Internet or a LAN (Local Area Network). It is to be noted that the communication unit 14 and the robot 15 may directly communicate with each other without through the communication network.

The robot 15 moves on the basis of the robot control data from the communication unit 14.

1.2 Operation

Figure 5:
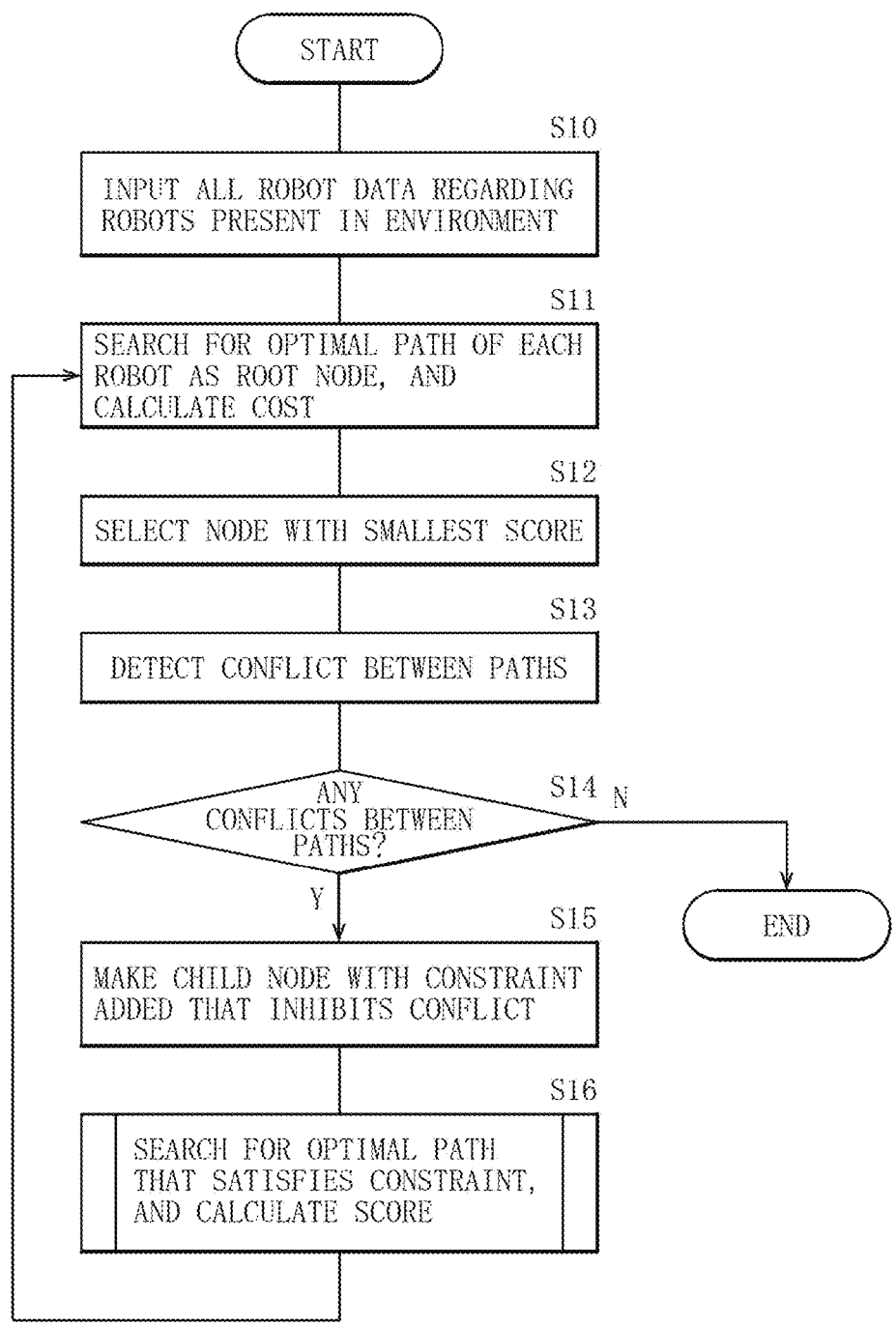
FIG. 5 is a flowchart illustrating an example of an overall processing flow of the path planning device according to the first embodiment.

FIG. 5 is a flowchart illustrating an example of an overall processing flow of the path planning device according to the first embodiment.

The path planning device according to the first embodiment adds extensive processing by the algorithm described above in the overview, to the CBS algorithm as the path planning technique related to the comparative example described above as a base. First, with reference to FIG. 5, an overall processing flow is described. In the processing illustrated in FIG. 5, the process of step S10 and the specific contents of the process of step S16 are different from the CBS algorithm.

First, the robot data regarding all of the multiple robots 15 present in the environment to be subjected to the path planning is inputted to the path planning unit 11 through the robot data input unit 10 (step S10). Next, the path planning unit 11 searches for the optimal paths of the respective robots 15 as root nodes, and calculates the costs (step S11). Next, the path planning unit 11 selects the node having the smallest score (step S12). Next, the path planning unit 11 detects a conflict between the paths of the multiple robots 15 (step S13).

Next, the path planning unit 11 determines presence or absence of any conflicts between the paths (step S14). In a case with a determination of the absence of conflicts between the paths (step S14; N), the path planning unit 11 ends the processing.

Meanwhile, in a case with a determination of the presence of a conflict between the paths (step S14; Y), the path planning unit 11 next creates a child node with a constraint added that inhibits the conflict (step S15). Next, the path planning unit 11 searches for an optimal path that satisfies the constraint, calculates a score (step S16), and causes the flow to return to the process of step S11. In step S16, the path planning for any one of the robots 15 is performed.

Figure 6:
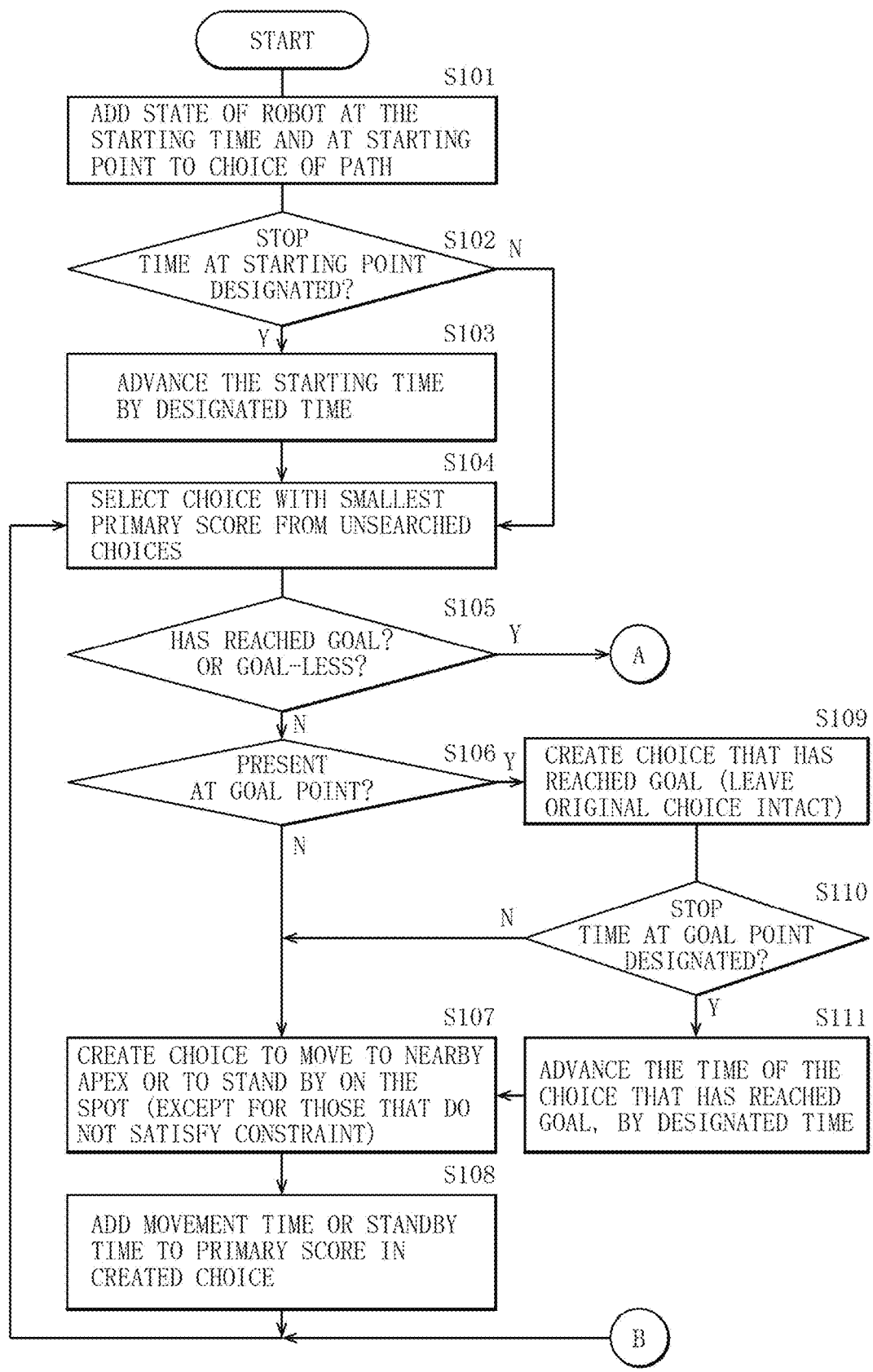
FIG. 6 is a flowchart illustrating an example of a detailed processing flow of a process of step S16 in FIG. 5.
Figure 7:
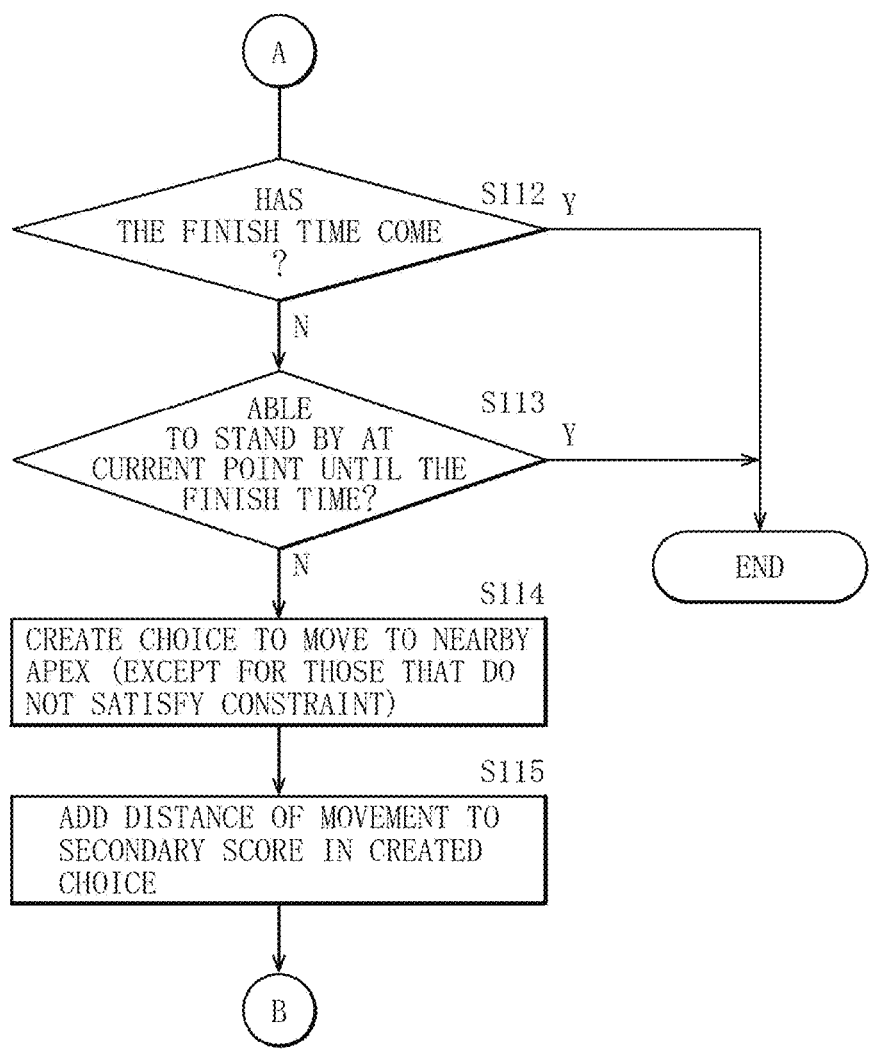
FIG. 7 is a flowchart illustrating an example of a processing flow subsequent to processing A in FIG. 6.

FIG. 6 is a flowchart illustrating an example of a detailed processing flow of the process of step S16 in FIG. 5. FIG. 7 is a flowchart illustrating an example of a processing flow subsequent to processing A in FIG. 6.

The processing illustrated in FIGS. 6 and 7 includes all the processing by the algorithm described in the forgoing overview. It is to be noted that FIGS. 6 and 7 are flows for the path planning with respect to any one robot 15.

First, the path planning unit 11 adds a state of the robot 15 at the starting time and at the starting point, to the choice of the path (step S101). The state of the robot 15 is, for example, a direction and a position of the robot 15, without limitation. Next, the path planning unit 11 determines whether or not the stop time at the starting point is designated (step S102). In a case where it is determined that the stop time at the starting point is not designated (step S102; N), the path planning unit 11 next causes the flow to proceed to the process of step S104. Meanwhile, in a case where it is determined that the stop time at the starting point is designated (step S102; Y), the path planning unit 11 next advances the starting time by the designated time (step S103).

Next, the path planning unit 11 selects the choice having the smallest primary score from the unsearched choices (step S104). Next, the path planning unit 11 determines whether or not the robot 15 to be subjected to the path planning has reached the goal, or whether or not the robot 15 to be subjected to the path planning is goal-less (step S105).

In a case where it is determined that the robot 15 to be subjected to the path planning has reached the goal or the target robot 15 has no goal (step S105; Y), the path planning unit 11 next determines whether or not the finish time has come (step S112). Here, the finish time is the time at which all of the robots R10 having the goals have reached the goals. In a case where it is determined that the finish time has come (step S112; Y), the path planning unit 11 ends the processing.

Meanwhile, in a case where it is determined that the finish time has not come (step S112; N), the path planning unit 11 next determines whether or not the robot 15 to be subjected to the path planning is able to stand by at the current point until the finish time (step S113). In a case where it is determined that the robot 15 is able to stand by at the current point until the finish time (step S113; Y), the path planning unit 11 ends the processing. Meanwhile, in a case where it is determined that the robot 15 is not able to stand by at the current point until the finish time (step S113; N), the path planning unit 11 next creates a choice to move to a nearby apex (except for those that do not satisfy the constraint) (step S114). Next, the path planning unit 11 adds the distance of movement to the secondary score in the created choice (step S115), and causes the flow to return to the process of step S104.

Moreover, in step S105 described above, in a case where it is determined that the robot 15 to be subjected to the path planning has not reached the goal or the robot 15 to be subjected to the path planning has the goal (step S105; N), the path planning unit 11 next determines whether or not the robot 15 to be subjected to the path planning is at the goal point (step S106). In a case where it is determined that the robot 15 to be subjected to the path planning is not at the goal point (step S106; N), the path planning unit 11 next creates a choice that allows the robot 15 to be subjected to the path planning to move to a nearby apex or allows the robot 15 to be subjected to the path planning to stand by on the spot (except for those that do not satisfy the constraint) (step S107). Next, the path planning unit 11 adds the movement time or the standby time of the robot 15 to be subjected to the path planning, to the primary score in the created choice (step S108).

Meanwhile, in a case where it is determined that the robot 15 to be subjected to the path planning is at the goal point (step S106; Y), the path planning unit 11 next creates a choice that has already reached the goal (leaves the original choice intact) (step S109). Next, the path planning unit 11 determines whether or not the stop time at the goal point of the robot 15 to be subjected to the path planning is designated (step S110). In a case where it is determined that the stop time at the goal point is not designated (step S110; N), the path planning unit 11 next causes the flow to proceed to the process of step S107. Meanwhile, in a case where it is determined that the stop time at the goal point is designated (step S110; Y), the path planning unit 11 next advances the time of the choice that has reached the goal, by the designated time (step S111), and causes the flow to proceed to the process of step S107.

It is to be noted that, in step S109, in the process of creating the choice that has reached the goal, while the choice selected in the process of step S104 is left intact, the choice is newly created that has been marked as having reached the goal along the same path as the selected choice. One reason why the original choice is left intact is to consider the path to pass through the goal once and return later as described above. In the process of step S107 after step S109 or S111, the "original choice" selected in the immediately preceding process of step S104 is moved to the nearby apex. The choice newly created in step S109 is selected in the procedure of step S104 afterward, and the processing until the end is carried out.

(User Interface)

Next, an example of a UI screen is described that utilizes features of the algorithm of the path planning by the path planning device according to the first embodiment. As described, the significant features of the present algorithm are: to plan post-goal movement of the robot R10 having the goal; and to plan the movement of the goal-less robot R20. Thus, let us consider a UI screen that displays not only the path of post-goal movement of the robot R10 having the goal, but also the path of movement of the goal-less robot R20, instead of simply illustrating a path to a goal point.

The display unit 12 (FIG. 4) may display, on the UI screen, the behavior of the goal-less robot R20 and post-goal behavior of the robot 15 that has reached the goal, in a different mode from the behavior of the multiple robots R10 having the goals until each of the multiple robots R10 having the goal has reached the goal.

The display unit 12 may display, in a linear shape, on the UI screen, data indicating the paths of movement with respect to all of the multiple robots 15, as the data indicating the behavior. In this case, the display unit 12 may display, on the UI screen, a line indicating a path of movement of the goal-less robot R20 and a line indicating a path of post-goal movement of the robot 15 that has reached the goal, with at least one of a line style, a line color, or a line width modified from a line indicating a path of movement until each of the multiple robots R10 having the goals has reached the goal.

Figure 8:
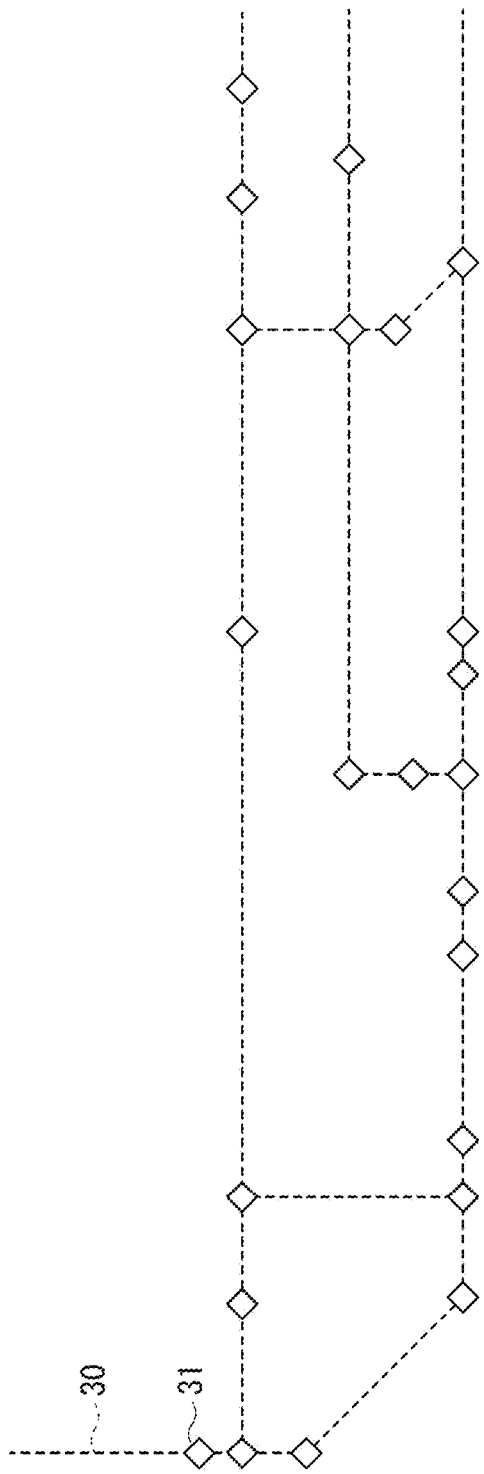
FIG. 8 is an explanatory diagram schematically illustrating a display example of an initial state of a user interface screen of a display unit of the path planning device according to the first embodiment.

FIG. 8 schematically illustrates a display example of an initial state of the UI screen on the display unit 12 of the path planning device according to the first embodiment.

On the UI screen, for example, movable paths (movable ranges) 30 and stoppable points (standby-able points) 31 of the multiple robots 15 are displayed.

Figure 9:
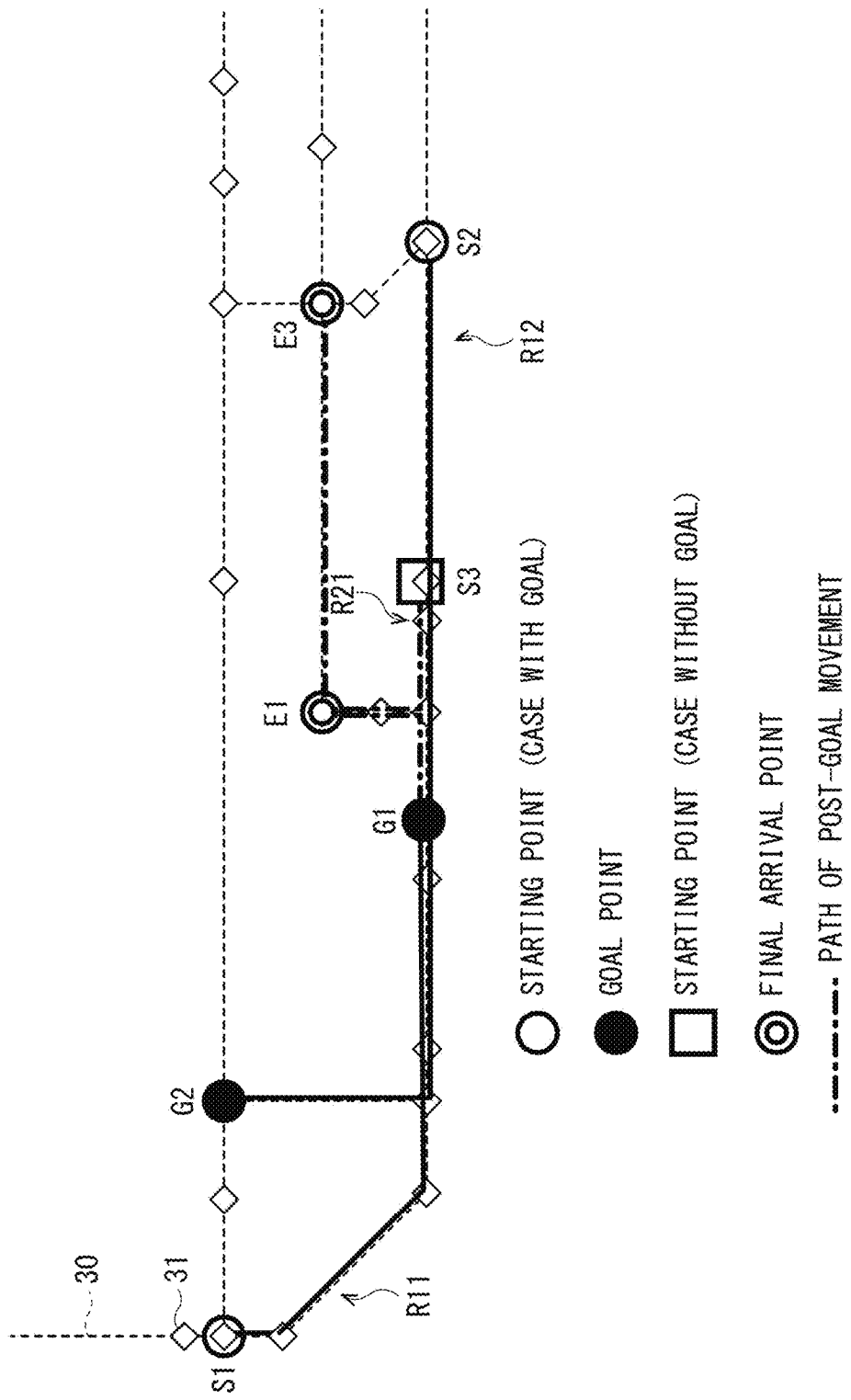
FIG. 9 is an explanatory diagram schematically illustrating a first display example that displays a path plan planned by a path planning unit, on the user interface screen illustrated in FIG. 8.
Figure 10:
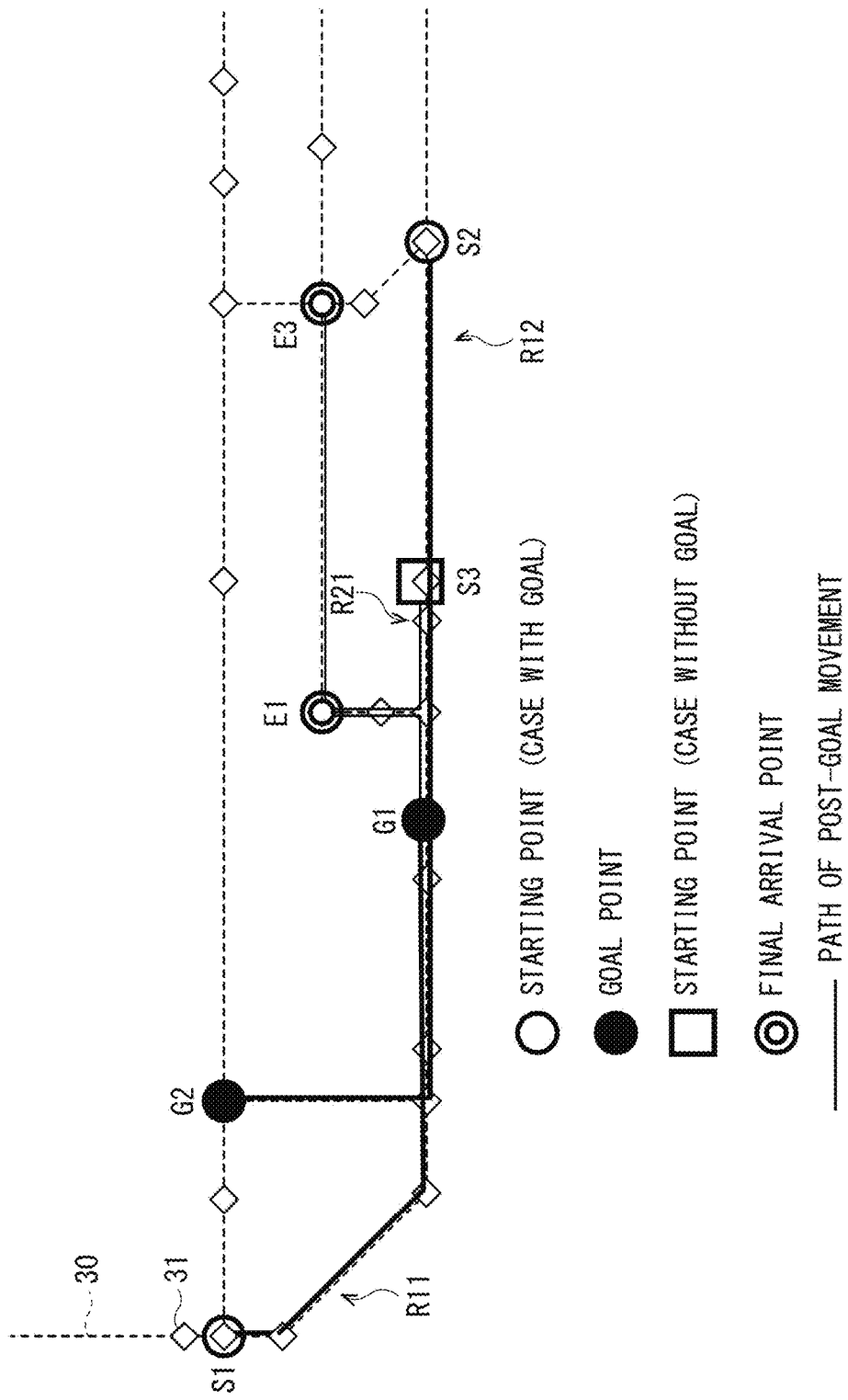
FIG. 10 is an explanatory diagram schematically illustrating a second display example that displays the path plan planned by the path planning unit, on the user interface screen illustrated in FIG. 8.
Figure 11:
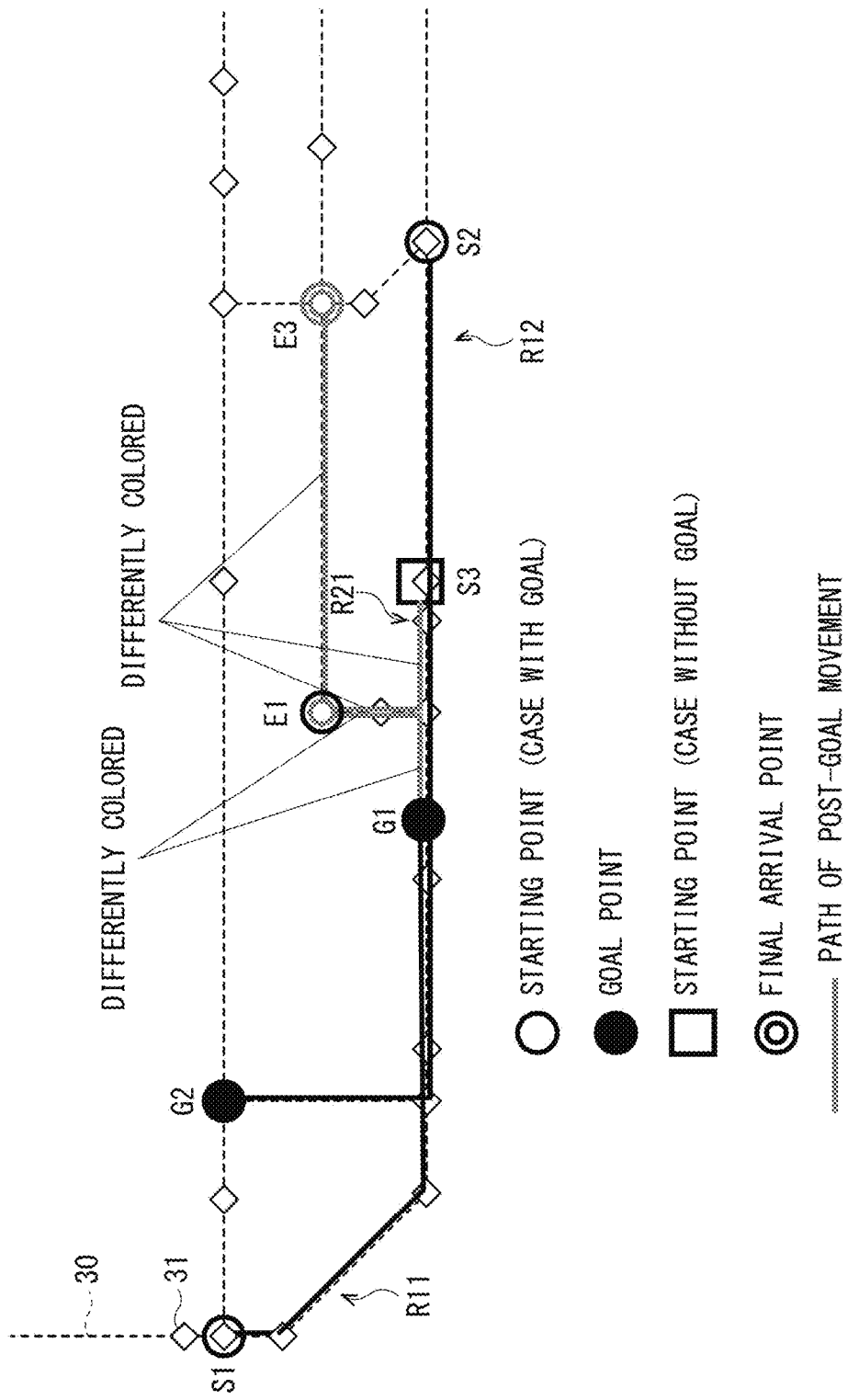
FIG. 11 is an explanatory diagram schematically illustrating a third display example that displays the path plan planned by the path planning unit, on the user interface screen illustrated in FIG. 8.

FIGS. 9 to 11 schematically illustrate first to third display examples in which the path plans planned by the path planning unit 11 are displayed on the UI screen illustrated in FIG. 8.

FIGS. 9 to 11 illustrate the display examples of the paths of movement of the goal-less robot R21, and the robots R11 and R12 having the goals. The path of movement of each of the robots may be provided in color-coded display. The white circle and the black circle respectively represent the starting point and the goal point of the movement of the robot R11 or R12 having the goal. The square represents the starting point of the movement of the goal-less robot R21. In each example in FIGS. 9 to 11, the robot R12 having the goal also moves after reaching the goal. The double circle represents a final arrival point of the goal-less robot R21, or a final post-goal arrival point of the robot R12 having the goal. It is to be noted that the symbols representing, for example, the starting point and the goal point described above are merely examples, and may be displayed in other modes.

In each example in FIGS. 9 to 11, the paths of movement to the goal points of the robots R11 and R12 having the goals are indicated by thick solid lines. In each example in FIGS. 9 to 11, the path of movement of the goal-less robot R21 and the path of post-goal movement of the robot R12 having the goal are displayed in a different mode from the paths of movement to the goal points of the robots R11 and R12 having the goals.

For example, in FIG. 9, the path of movement of the goal-less robot R21 and the path of post-goal movement of the robot R12 having the goal are displayed, with the line type modified. FIG. 9 illustrates a display example where, for example, the line type is modified to a long dashed short dashed line, but other line types may be used.

Moreover, for example, in FIG. 10, the path of movement of the goal-less robot R21 and the path of post-goal movement of the robot R12 having the goal are displayed, with the line width modified. FIG. 9 illustrates a display example in which, for example, the line width modified to be thinner. Thus, with respect to the robot R12 having the goal, the path of movement at the goal point of particular interest to the user is highlighted by a thick line, while the post-goal movement is also displayed.

Furthermore, for example, in FIG. 11, the path of movement of the goal-less robot R21 and the path of post-goal movement of the robot R12 having the goal are displayed, with the line color modified.

In addition, it is to be noted that the display examples mentioned above may be combined. For example, the display is provided, with a combination of at least two of the line type, the line color, and the line width modified.

1.3 Application Example

Figure 12:
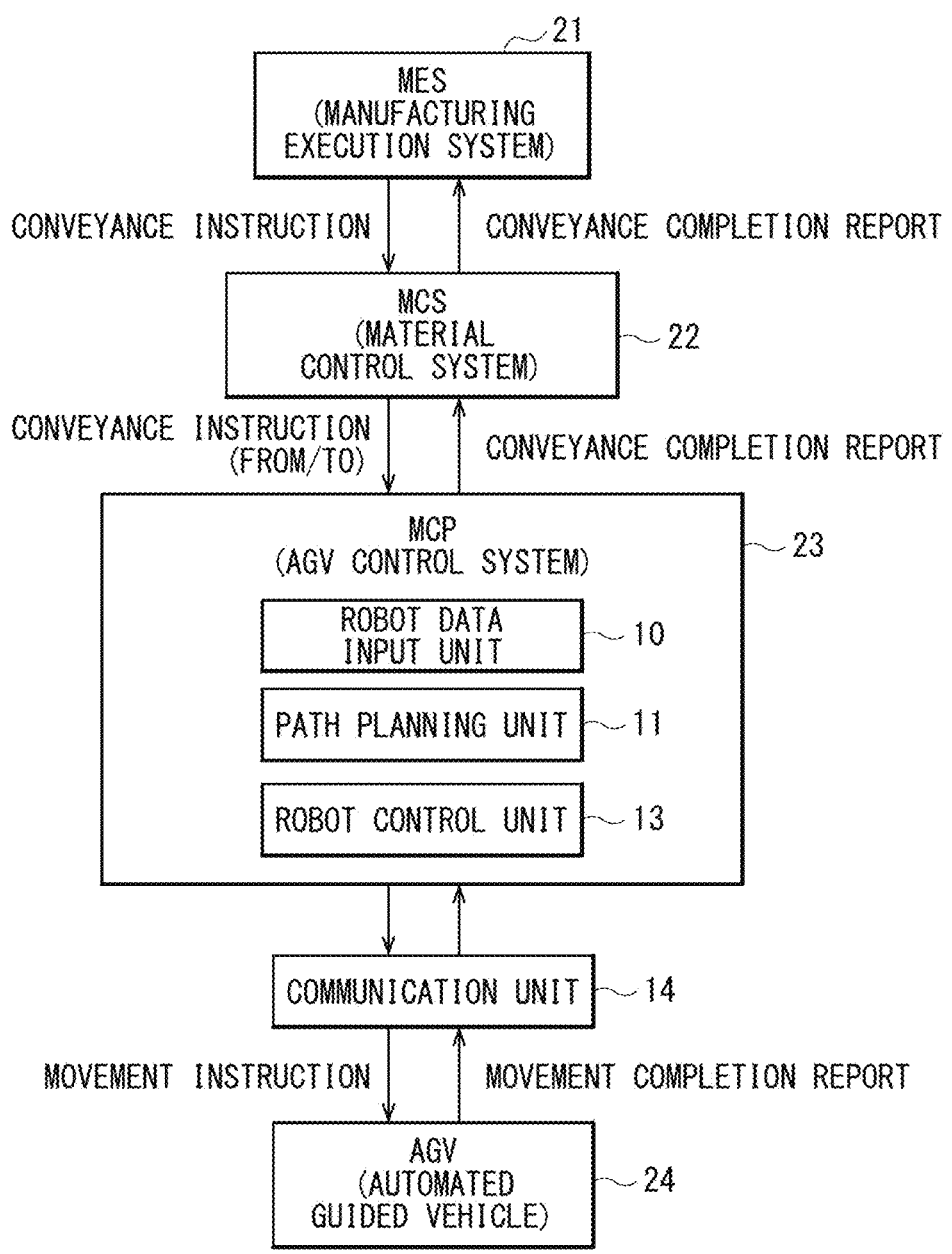
FIG. 12 is a block diagram schematically illustrating an example of a system to which the path planning device according to the first embodiment is applied.

FIG. 12 schematically illustrates an example of a system to which the path planning device according to the first embodiment is applied.

FIG. 12 illustrates an example of a system in which the path planning device according to the first embodiment is applied to an automatic conveyance system in a factory using an automated guided vehicle (Automated Guided Vehicle: hereinafter referred to as AGV) 24. In this system, the AGV 24 is a moving body and corresponds to the robot 15 in FIG. 4. The multiple AGVs 24 may be present. In this case, the multiple AGVs 24 may include at least one AGV having a goal and at least one goal-less AGV.

The automatic conveyance system includes a manufacturing execution system (MES) 21, the material control system (MCS) 22, an AGV control system (MCP) 23 and the AGV 24.

The MES 21 issues a conveyance instruction to the MCS 22 on the basis of manufacture processing. An example of the conveyance instruction here is, for example, "convey C from the device A to the device B".

On the basis of the received conveyance instruction, the MCS 22 determines which AGV 24 to use, and how to make the conveyance, and further issues a conveyance instruction to the MCP 23. For example, in a case where an AGV 24A is present as one of the multiple AGVs 24, an example of the conveyance instruction is "the AGV 24A to convey C from point A to point B".

Upon receiving the conveyance instruction, the MCP 23 determines a specific path of movement of the AGV 24. The MCP 23 includes the robot data input unit 10, the path planning unit 11, and the robot control unit 13 in the path planning device illustrated in FIG. 4. In the MCP 23, data regarding the AGV 24 is inputted to the path planning unit 11 through the robot data input unit 10, to plan the path of the AGV 24. At this occasion, in a case with the presence of other AGVs 24 than the AGV 24A to which the instruction mentioned above has been issued, data regarding the relevant AGVs 24 is also inputted to the path planning unit 11. The MCP 23 or the MCS 22 holds data regarding all of the AGVs 24 present in the environment (the current position or the current goal point), and the data are used. Moreover, at this occasion, paths of other AGVs than the AGV 24A to which the conveyance instruction is issued may be changed.

The path of the AGV 24 planned by the path planning unit 11 is sent from the robot control unit 13 to the AGV 24 through the communication unit 14. When the AGV 24 arrives at the destination, a movement completion notification is sent back through the communication unit 14. On the basis thereof, a conveyance completion report is sent to the MES 21.

1.4 Effects

As described, according to the path planning device of the first embodiment, on the basis of the data regarding all of the multiple robots 15 including the robot R10 having the goal and the goal-less robot R20, the behavior until the time at which the robot R10 having the goal has reached the goal is planned, with respect to all of the multiple robots 15. Hence, it is possible to plan the optimal paths of the multiple robots 15.

According to the path planning device of the first embodiment, the path planning is carried out, inclusive of the goal-less robot R20. In the path planning, the optimal paths are calculated to inhibit the conflicts with the goal-less robot R20 and the robot R10 having the goal after the robot 10 has reached the goal. This makes it possible to calculate more optimal paths (paths with short arrival time at the goal). Moreover, it is possible to designate the same goal for the multiple robots 15.

Moreover, according to the path planning device of the first embodiment, in planning the post-goal movement of the robot R10 having the goal, the path is planned, with the distance of movement assumed as the cost. This eliminates wasteful movement from the movement of the goal-less robot R20 and the post-goal movement of the robot R10 having the goal. This leads to power saving.

Furthermore, according to the path planning device of the first embodiment, the optimal paths are planned in consideration of the stop time at the starting point and the goal point. Hence, it is possible to plan more optimal paths.

In addition, according to the path planning device of the first embodiment, the path of the post-goal movement of the robot R10 having the goal is displayed on the UI screen. This makes it possible to visually obtain the data regarding the post-goal movement.

It is to be noted that the effects described in the specification are merely illustrative and non-limiting, and there may be other effects. This also applies to effects of other embodiments in the following.

2. OTHER EMBODIMENTS

The technology of the present disclosure are not limited to the description in the forgoing embodiments, but may be modified in a variety of ways.

For example, the present technology may have the following configurations.

According to the technology having the following configurations, on the basis of the data regarding all of the moving bodies including the at least one first moving body having the goal and the at least one second goal-less moving body, the behavior until the time at which the first moving body has reached the goal is planned, with respect to all of the multiple moving bodies. Hence, it is possible to plan the optimal paths of the multiple moving bodies.

(1)

A path planning device including:
an input unit that accepts an input of data to be used in path planning, with respect to all of multiple moving bodies present in environment to be subjected to the path planning, the multiple moving bodies including at least one first moving body having a goal and at least one second goal-less moving body; and
a planning unit that plans behavior until time at which the first moving body has reached the goal, with respect to all of the multiple moving bodies, on the basis of the data inputted into the input unit.

(2)

The path planning device according to (1), in which the planning unit plans optimal behavior to inhibit the multiple moving bodies from conflicting with each other until the time at which the first moving body has reached the goal.

(3)

The path planning device according to (1) or (2), in which the planning unit sets time until the first moving body arrives at a goal point and carries out a predetermined task, as the time at which the first moving body has reached the goal.

(4)

The path planning device according to any one of (1) to (3), in which
in a case where the first multiple moving bodies are present, the planning unit plans behavior until time at which all of the multiple first moving bodies have reached the goal, with respect to all the first multiple moving bodies.

(5)

The path planning device according to (4), in which the planning unit plans time-optimal behavior to make earliest the time at which all of the first multiple moving bodies have reached the goal.

(6)

The path planning device according to (4) or (5), in which in a case where a part of the first multiple moving bodies has reached the goal before the time at which all of the multiple first bodies have reached the goals, the planning unit plans post-goal behavior of the part of the multiple first moving bodies, until the time comes when all of the multiple first moving bodies have reached the goals, the part of the multiple first moving bodies including at least one of the multiple first moving bodies.

(7)

The path planning device according to (6), in which the planning unit plans distance-optimal behavior to make shortest a distance of movement with respect to behavior of the second moving body and the post-goal behavior of the part of the multiple first moving bodies.

(8)

The path planning device according to (6) or (7), further including a display unit that displays data indicating the behavior planned by the planning unit with respect to all of the multiple moving bodies, to display behavior of the second moving body and the post-goal behavior of the part of the multiple first moving bodies, in a different mode from behavior until each of the multiple first moving bodies has reached the goal.

(9)

The path planning device according to (8), in which the display unit displays, in a linear shape, data indicating paths of movement with respect to all of the multiple moving bodies, as the data indicating the behavior, and displays a line indicating a path of movement of the second moving body and a line indicating a path of post-goal movement of the part of the multiple first moving bodies, in a different form, in at least one of a line style, a line color, or a line width, from a line indicating a path of movement until each of the multiple first moving bodies has reached the goal.

(10)

The path planning device according to any one of (1) to (9), in which
the data to be used in the path planning includes data regarding stop time at at least one of a starting point or a goal point.

(11)

The path planning device according to any one of (1) to (10), in which
the behavior includes moving and standing by with respect to all of the multiple moving bodies.

It should be understood by those skilled in the art that various modifications, combinations, sub-combinations, and alterations may occur depending on design requirements and other factors insofar as they are within the scope of the appended claims or the equivalents thereof.

The invention claimed is:

1. A path planning device comprising:
an input device comprising at least one of a keyboard or a mouse:
a transceiver;
a display; and
control circuitry that:
controls the display to display a predetermined environment that includes plural predetermined moving body paths that connect predetermined plural moving body stopping positions;
accepts an input of data from the input device, the data to be used in path planning in the predetermined environment, with respect to all of multiple moving bodies present in the predetermined environment that are to be subjected to the path planning, the multiple moving bodies including at least one first moving body having a respective first moving body goal and at least one second goal-less moving body;
based on the data from the input device, plans a behavior of all of the multiple moving bodies, the behavior comprising one or more movements of each of the multiple moving bodies between selected ones of the predetermined plural moving body stopping positions along corresponding ones of the plural predetermined moving body paths, the behavior being a behavior until a time at which the at least one first moving body has reached the respective first moving body goal;
controls the display to display the planned behavior on the predetermined environment; and
controls the transceiver to transmit the planned behavior to the multiple moving bodies for execution by the multiple moving bodies,
wherein the at least one first moving body comprises multiple first moving bodies, and the behavior is a behavior of all of the multiple moving bodies from an earliest respective first moving body start time until a time at which all of the multiple first moving bodies are to have reached their respective moving body goals, wherein the behavior is a behavior, of a plurality of possible behaviors, that makes earliest the time at which all of the multiple first moving bodies have reached their respective moving body goals, wherein, in a case where a part of the multiple first moving bodies has reached their respective moving body goals before a time at which all of the multiple first bodies have reached their respective moving body goals, the control circuitry plans a respective post-goal behavior of each of the first moving bodies of the part of the multiple first moving bodies, the respective post-goal behavior of each of the first moving bodies of the part of the multiple first moving bodies being a movement to a temporary moving body goal and lasting until a time when all remaining first moving bodies of the multiple first moving bodies have reached their respective first body goals, and wherein the respective post-goal behavior of each of the first moving bodies of the part of the multiple first moving bodies further comprises a movement back to their respective moving body goals after the time at which all of the remaining multiple first bodies have reached their respective moving body goals.

2. The path planning device according to claim 1, wherein the behavior is a behavior that inhibits the multiple moving bodies from conflicting with each other until the time at which the at least one first moving body has reached the respective first moving body goal.

3. The path planning device according to claim 1, wherein, based on the data from the input device, the control circuitry sets the time at which the at least one first moving body is to reach the respective first moving body goal.

4. The path planning device according to claim 1, wherein the respective behaviors of the remaining first moving bodies of the multiple first moving bodies are determined based on a behavior of the at least one second goal-less moving body and the respective post-goal behaviors of each of the first moving bodies of the part of the multiple first moving bodies so that the respective behaviors of the remaining first moving bodies of the multiple first moving bodies comprise a shortest distance to their respective moving body goals.

5. The path planning device according to claim 4, wherein the behavior of the at least one second goal-less moving body and the respective post-goal behavior of each of the first moving bodies of the part of the multiple first moving bodies are displayed in a first mode before the time when all remaining first moving bodies of the multiple first moving bodies have reached their respective first body goals, and are displayed in a second mode different from the first mode after the time when all remaining first moving bodies of the multiple first moving bodies have reached their respective first body goals.

6. The path planning device according to claim 5, wherein
the first mode comprises at least one of a first line style, a first line color, or a first line width, and
the second mode comprises at least one of a second line style, a second line color, or a second line width.

7. The path planning device according to claim 1, wherein the data to be used in the path planning includes data regarding a stop time and at least one of a respective moving body starting point in the environment or a respective moving body goal position in the environment.

8. The path planning device according to claim 1, wherein the behavior includes moving and standing by all of the multiple moving bodies.

9. A method performed by a path planning device that includes an input device comprising at least one of a keyboard or a mouse, a transceiver, a display, and control circuitry, the method comprising:

controlling the display to display a predetermined environment that includes plural predetermined moving body paths that connect predetermined plural moving body stopping positions;

accepting an input of data from the input device, the data to be used in path planning in the predetermined environment, with respect to all of multiple moving bodies present in the predetermined environment that are to be subjected to the path planning, the multiple moving bodies including at least one first moving body having a respective first moving body goal and at least one second goal-less moving body;

based on the data from the input device, planning a behavior of all of the multiple moving bodies, the behavior comprising one or more movements of each of the multiple moving bodies between selected ones of the predetermined plural moving body stopping positions along corresponding ones of the plural predetermined moving body paths, the behavior being a behavior until a time at which the at least one first moving body has reached the respective first moving body goal;

controlling the display to display the planned behavior on the predetermined environment; and controlling the transceiver to transmit the planned behavior to the multiple moving bodies for execution by the multiple moving bodies, wherein the at least one first moving body comprises multiple first moving bodies, and the behavior is a behavior of all of the multiple moving bodies from an earliest respective first moving body start time until a time at which all of the multiple first moving bodies are to have reached their respective moving body goals, wherein the behavior is a behavior, of a plurality of possible behaviors, that makes earliest the time at which all of the multiple first moving bodies have reached their respective moving body goals, wherein, in a case where a part of the multiple first moving bodies has reached their respective moving body goals before a time at which all of the multiple first bodies have reached their respective moving body goals, the method further comprises planning a respective post-goal behavior of each of the first moving bodies of the part of the multiple first moving bodies, the respective post-goal behavior of each of the first moving bodies of the part of the multiple first moving bodies being a movement to a temporary moving body goal and lasting until a time when all remaining first moving bodies of the multiple first moving bodies have reached their respective first body goals, and wherein the respective post-goal behavior of each of the first moving bodies of the part of the multiple first moving bodies further comprises a movement back to their respective moving body goals after the time at which all of the remaining multiple first bodies have reached their respective moving body goals.

10. A non-transitory computer product containing instructions for a method performed by a path planning device that includes an input device comprising at least one of a keyboard or a mouse, a display, a transceiver and control circuitry, the method comprising:

controlling the display to display a predetermined environment that includes plural predetermined moving body paths that connect predetermined plural moving body stopping positions;

accepting an input of data from the input device, the data to be used in path planning in the predetermined environment, with respect to all of multiple moving bodies present in the predetermined environment that are to be subjected to the path planning, the multiple moving bodies including at least one first moving body having a respective first moving body goal and at least one second goal-less moving body;

based on the data from the input device, planning a behavior of all of the multiple moving bodies, the behavior comprising one or more movements of each of the multiple moving bodies between selected ones of the predetermined plural moving body stopping positions along corresponding ones of the plural predetermined moving body paths, the behavior being a behavior until a time at which the at least one first moving body has reached the respective first moving body goal;

controlling the display to display the planned behavior on the predetermined environment; and controlling the transceiver to transmit the planned behavior to the multiple moving bodies for execution by the multiple moving bodies, wherein the at least one first moving body comprises multiple first moving bodies, and the behavior is a behavior of all of the multiple moving bodies from an earliest respective first moving body start time until a time at which all of the multiple first moving bodies are to have reached their respective moving body goals, wherein the behavior is a behavior, of a plurality of possible behaviors, that makes earliest the time at which all of the multiple first moving bodies have reached their respective moving body goals, wherein, in a case where a part of the multiple first moving bodies has reached their respective moving body goals before a time at which all of the multiple first bodies have reached their respective moving body goals, the method further comprises planning a respective post-goal behavior of each of the first moving bodies of the part of the multiple first moving bodies, the respective post-goal behavior of each of the first moving bodies of the part of the multiple first moving bodies being a movement to a temporary moving body goal and lasting until a time when all remaining first moving bodies of the multiple first moving bodies have reached their respective first body goals, and wherein the respective post-goal behavior of each of the first moving bodies of the part of the multiple first moving bodies further comprises a movement back to their respective moving body goals after the time at which all of the remaining multiple first bodies have reached their respective moving body goals.

* * * * *